Sept. 1, 1959

W. H. McCULLOCH 2,902,054

THROTTLING PLUG VALVE

Filed Aug. 28, 1957

INVENTOR.
Winfield H. McCulloch,

BY John S. Schneider

ATTORNEY.

United States Patent Office 2,902,054
Patented Sept. 1, 1959

2,902,054
THROTTLING PLUG VALVE

Winfield H. McCulloch, Corpus Christi, Tex., assignor, by mesne assignments, to Jersey Production Research Company, Tulsa, Okla., a corporation of Delaware Application August 28, 1957, Serial No. 680,809

1 Claim. (Cl. 137—625.12)

This device relates to a throttle type plug valve. Briefly, the invention comprises a valve casing formed to provide a chamber and fluid inlet and outlet passages; and a core body movably arranged in the chamber and formed to provide a plug portion adapted to prevent fluid flow completely through the inlet and outlet passages; a restricted fluid flow portion adapted to permit a restricted fluid flow through the inlet and outlet passages, and an opening adapted to permit full, unrestricted fluid flow through said inlet and outlet passages.

When fluids, such as oil, water, gas, or mud, under high pressure are admitted to a region of lower pressure, the receptacle or other receiving element of the lower pressure region may be damaged because of too rapid equalization of the higher and lower pressures.

An object, therefore, of the present invention is to provide a device which permits higher and lower fluid pressures to equalize as rapidly or as slowly as desired, thereby eliminating or diminishing the deleterious effects caused by the passage of high pressure fluids to regions of lower pressure.

A further object of this invention is to provide a device which permits free, unrestricted flow of fluids therethrough.

The above objects and other objects of this invention will be apparent from a description of the invention taken in conjunction with the drawings wherein.

Figure 1:
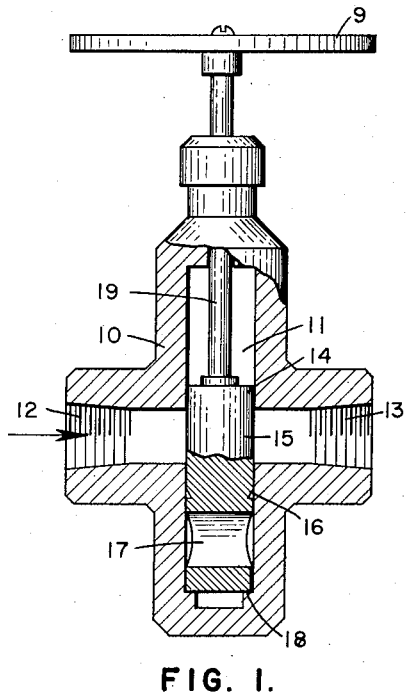
Figs. 1 through 3 are vertical, partially sectional views of one embodiment of the invention in various operative positions.

In Fig. 1 is shown a valve casing 10 formed to provide a chamber 11 and inlet and outlet passages 12 and 13. Arranged in chamber 11 is a core or plug 14. Core 14 is formed to provide a cylindrical portion 15 which, in the position of Fig. 1, is adapted to close off completely fluid flow through the inlet and outlet passages 12 and 13, respectively. Also, core 14 is provided with an annular groove or recess 16 and a full opening 17 through core 14. The valve body or casing 10 is provided with a shoulder 18 which provides a seat for the lower end portion of core 14. A valve stem 19 is connected to the upper portion of core 14 and extends through the valve casing 10 to a handle 9. Suitable packing glands, not shown, are provided in the upper portion of the valve casing 10 to seal off fluid flow between the valve stem and the valve casing.

Figure 2:
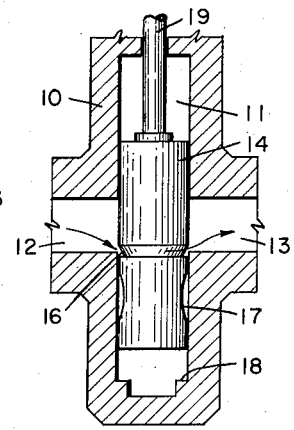
Figure 3:
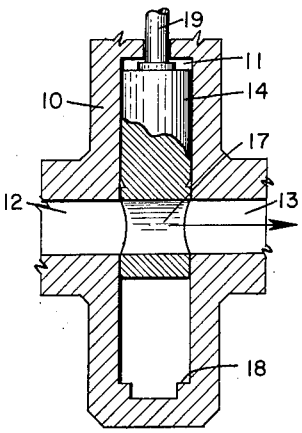

The valve stem 19 and attached core 14 are vertically movable in chamber 11. In Fig. 2 the valve stem has been raised sufficiently to place groove 16 in fluid communication with inlet and outlet passages 12 and 13, respectively. In Fig. 3 valve stem 19 has been raised sufficiently to place openings 17 in full, unrestricted fluid communication with inlet and outlet openings 12 and 13, respectively.

Figure 4:
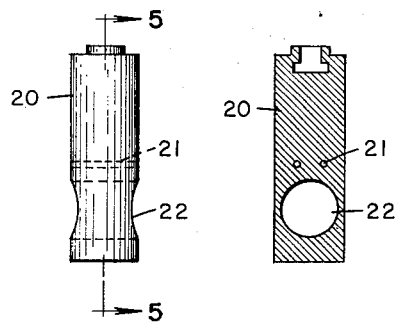
Fig. 4 is a vertical view of another embodiment of the invention.
Figure 5:
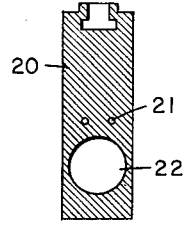
Fig. 5 is a view taken on lines 5—5 of Fig. 4.

Figs. 4 and 5 show a modified core 20 which may be substituted for the core 14 of Figs. 1–3. Core 20 is formed to provide a series of small ports or openings 21, which may be of varying size, extending through core 20. A large opening 22, similar to opening 17 of core 14, is also formed in core 20.

Figure 6:
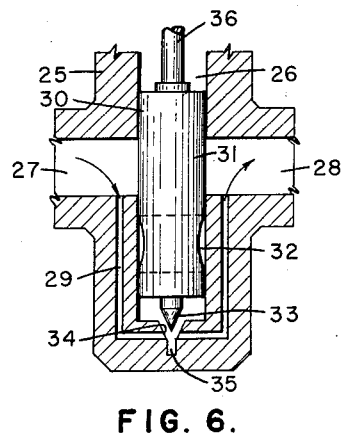
Fig. 6 is a vertical view, partly in section, of still another embodiment of the invention.

In Fig. 6 is shown a valve casing 25 formed to provide a chamber 26 and inlet and outlet passages 27 and 28, respectively. Additionally, a by-pass passage 29 is provided in valve casing 25. A core 30 is arranged in chamber 26 and is provided with a plug portion 31, a large opening 32, and a tapered end portion 33. Valve casing 25 is formed to provide a tapered seat 34 and an indent or recess 35. The tapered portion 33 of core 30 is adapted to extend into recess 35 and engage seat 34 in one position to close off fluid flow through by-pass passage 29. A valve stem 36 is connected to the upper portion of core 30. Although not shown, valve stem 36 connects to a handle and the valve casing 25 is provided with suitable packing glands to seal off valve stem 36, as described relative to the Fig. 1 embodiment.

In operation, as seen in Figs. 1 through 3, when it is desired to open fluid flow through inlet and outlet passages 12 and 13, the valve stem 19 and attached core 14 are raised by means of handle 9. Valve stem 19 may be provided with screw threads whereby valve stem 19 is rotated by means of handle 9 to raise and lower core 14, or valve stem 19 and core 14 may be raised and lowered by pulling up and pushing down on handle 9.

As seen in Fig. 2, when core 14 has been raised a predetermined amount, groove 16 is in fluid communication with inlet and outlet passages 12 and 13, respectively, and restricted flow is permitted through valve casing 10. Further raising of the core 14 places opening 17 in fluid communication with inlet and outlet passages 12 and 13, respectively, and at the full opening position, as seen in Fig. 3, completely unrestricted flow is obtained through the inlet and outlet passages.

The operation of the modified device of Figs. 4 and 5 is similar to the operation of the device of Figs. 1 through 3. However, in this instance, instead of the annular groove or recess 16 fluidly communicating with the inlet and outlet passages 12 and 13, respectively, the series of small openings 21 are employed to provide the initial restricted flow which is utilized to equalize the up-stream and down-stream pressures. The remaining operation is the same as the operation of Figs. 1–3. After equalization of the higher and lower pressures (to any desired degree) through ports 21, core 20 is raised an amount sufficient to place opening 22 in alignment with inlet and outlet passages 12 and 13, respectively, in order to provide completely unrestricted flow through valve casing 10.

The operation of the embodiment of Fig. 6 is also similar to the modifications of Figs. 1 through 3 and Figs. 4 and 5. Herein, when the valve is closed, the tapered portion 33 of core 30 is seated in indent 35 and on the tapered portion 34 of valve body 25, and plug portion 31 of core 30 is positioned in chamber 26 between inlet and outlet passages 27 and 28, respectively. When it is desired to permit restricted fluid flow through inlet and outlet passages 27 and 28, respectively, valve stem 36 and attached core 30 are raised to the position shown in Fig. 6. In this position fluid flow enters through inlet passage 27 and flows through by-pass passage 29 to outlet passage 28. This restricted flow equalizes the up-stream and down-stream pressures to any desired degree. To effect full, unrestricted fluid flow through inlet passage 27 and outlet passage 28, core 30 is raised until opening 32 is aligned with inlet and outlet passages 27 and 28, respectively.

In this position a full, unrestricted opening is provided through valve casing 25.

Having fully described the nature, objects, elements, and operation of my invention, I claim:

Apparatus comprising a valve casing provided with a bore and fluid inlet and outlet passages in communication with said bore; a core body sealingly and movably arranged in said bore, a first portion of said core body preventing fluid flow through said bore when said first portion is positioned between the inlet and outlet passages; a second portion of said core body having an opening therein to provide fluid communication through the bore when the second portion is positioned between said inlet and outlet passages; said core body having an annular recess adjacent said first portion of said core body; said recess providing a greater restriction to fluid flow through said bore when said recess is positioned between said inlet and outlet passages than said second portion when said second portion is positioned between said inlet and outlet passages; and also providing a greater restriction to fluid flow than the fluid flow permitted through said inlet and outlet passages alone.

References Cited in the file of this patent
UNITED STATES PATENTS

| | | |
|---|---|---|
| 2,489,623 | Delany | Nov. 29, 1949 |
| 2,601,304 | Lane | June 24, 1952 |